United States Patent
Nakazawa et al.

(10) Patent No.: US 12,500,614 B2
(45) Date of Patent: Dec. 16, 2025

(54) RADIO FREQUENCY MODULE AND COMMUNICATION DEVICE

(71) Applicant: Murata Manufacturing Co., Ltd., Nagaokakyo (JP)

(72) Inventors: Katsunari Nakazawa, Nagaokakyo (JP); Hiroyuki Kani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 315 days.

(21) Appl. No.: 18/476,331

(22) Filed: Sep. 28, 2023

(65) Prior Publication Data

US 2024/0022267 A1    Jan. 18, 2024

Related U.S. Application Data

(63) Continuation of application No. PCT/JP2022/007861, filed on Feb. 25, 2022.

(30) Foreign Application Priority Data

Mar. 31, 2021    (JP) .................................. 2021-061776

(51) Int. Cl.
*H04W 48/18*    (2009.01)
*H04B 1/00*    (2006.01)
(Continued)

(52) U.S. Cl.
CPC ............... *H04B 1/006* (2013.01); *H04B 1/04* (2013.01); *H04B 1/56* (2013.01); *H04B 2001/0408* (2013.01)

(58) Field of Classification Search
CPC . H04B 1/006; H04B 1/04; H04B 1/56; H04B 2001/0408; H04B 1/0057;
(Continued)

(56) References Cited

U.S. PATENT DOCUMENTS

| | | | |
|---|---|---|---|
| 9,609,463 B2 * | 3/2017 | Ryu | H04W 4/70 |
| 2018/0167094 A1 * | 6/2018 | Aramata | H04B 1/52 |
| 2021/0226672 A1 * | 7/2021 | Cho | H04B 1/0064 |

FOREIGN PATENT DOCUMENTS

| | | | |
|---|---|---|---|
| JP | 2000-269831 A | | 9/2000 |
| JP | 2019-092201 A | | 6/2019 |

(Continued)

OTHER PUBLICATIONS

International Search Report and Written Opinion mailed on May 31, 2022, received for PCT Application PCT/JP2022/007861, filed on Feb. 25, 2022, 8 pages including English Translation.

*Primary Examiner* — Tanmay K Shah
(74) *Attorney, Agent, or Firm* — XSENSUS LLP

(57) ABSTRACT

Assuming transmission signals in different frequency bands are simultaneously transmitted, the isolation lowering is suppressed. A radio frequency module includes a first power amplifier, a second power amplifier, a first switch, a second switch, a third switch, and a mounting substrate. The first switch, the second switch, and the third switch are configured to be capable of simultaneously connecting the first power amplifier and the second power amplifier to an antenna terminal. The first switch is disposed between the second switch and the third switch in plan view of the mounting substrate from a thickness direction. The second switch and the third switch are disposed on the same main surface out of the first main surface and the second main surface of the mounting substrate.

20 Claims, 7 Drawing Sheets

(51) Int. Cl.
*H04B 1/04* (2006.01)
*H04B 1/56* (2006.01)

(58) Field of Classification Search
CPC .. H04B 1/00; H04B 1/38; H01L 25/04; H01L 25/18; H03H 9/25
USPC ..................................................... 455/552.1
See application file for complete search history.

(56) References Cited

FOREIGN PATENT DOCUMENTS

| WO | 2016/010063 A1 | 1/2016 | |
|---|---|---|---|
| WO | 2019/003791 A1 | 1/2019 | |
| WO | WO-2021002156 A1 * | 1/2021 | ........... H04B 1/1607 |

\* cited by examiner

RADIO FREQUENCY MODULE AND COMMUNICATION DEVICE

CROSS-REFERENCE TO RELATED APPLICATIONS

This is a continuation application of PCT/JP2022/007861, filed on Feb. 25, 2022, designating the United States of America, which is based on and claims priority to Japanese Patent Application No. JP 2021-061776 filed on Mar. 31, 2021. The entire contents of the above-identified applications, including the specifications, drawings and claims, are incorporated herein by reference in their entirety.

TECHNICAL FIELD

The present Disclosure relates generally to a radio frequency module and a communication device, and more particularly to a radio frequency module and a communication device to amplify a first transmission signal and a second transmission signal.

BACKGROUND ART

A device for selecting a frequency band has been known (see Patent Document 1, for example). The front-end module (FET) of Patent Document 1 includes a single-pole double throw (SPDT) switch (first switch), two single-pole four throw (SP4T) switches (second switch and third switch), and eight surface acoustic wave (SAW) filters. The first switch changes connection of an antenna and the second switch, and connection of the antenna and the third switch. The second switch is connected to the first switch. The second switch selects one of the four SAW filters as a connection destination of the first switch. The third switch is connected to the first switch. The third switch selects one SAW filter out of four SAW filters different from the above-described four SAW filters as a connection destination of the first switch.

CITATION LIST

Patent Document

Patent Document 1: Japanese Unexamined Patent Application Publication No. 2019-092201

SUMMARY OF DISCLOSURE

Technical Problem

Meanwhile, there is a demand for simultaneously transmitting multiple transmission signals in different frequency bands. For example, in the FET of Patent Document 1, the first switch simultaneously connects the second switch and the third switch to mutually different SAW filters. With this, the FET of Patent Document 1 simultaneously transmits a transmission signal passing through one SAW filter connected to the second switch and a transmission signal passing through one SAW filter connected to the third switch. However, in the FET of Patent Document 1, assuming multiple transmission signals in different frequency bands are simultaneously transmitted, there is a possibility that isolation is lowered.

The present Disclosure has been made in view of the above-described issue, and an object of the present Disclosure is to provide a radio frequency module and a communication device capable of suppressing the isolation lowering assuming multiple transmission signals in different frequency bands are simultaneously transmitted.

Solution to Problem

A radio frequency module according to an aspect of the present Disclosure includes a first power amplifier, a second power amplifier, a first switch, a second switch, a third switch, and a mounting substrate. The first power amplifier amplifies a first transmission signal in a first frequency band. The second power amplifier amplifies a second transmission signal in a second frequency band different from the first frequency band. The first switch is connected to an antenna terminal. The second switch changes a connection of the first power amplifier and the first switch. The third switch changes a connection of the second power amplifier and the first switch. The mounting substrate has a first main surface and a second main surface opposed to each other, and the first power amplifier, the second power amplifier, the first switch, the second switch, and the third switch are disposed thereon. The first switch, the second switch, and the third switch are configured to be capable of simultaneously connecting the first power amplifier and the second power amplifier to the antenna terminal. The first switch is disposed between the second switch and the third switch in plan view of the mounting substrate from a thickness direction. The second switch and the third switch are disposed on the same main surface out of the first main surface and the second main surface of the mounting substrate.

A radio frequency module according to an aspect of the present Disclosure includes a first power amplifier, a second power amplifier, a first switch, a second switch, a third switch, and a mounting substrate. The first power amplifier amplifies a first transmission signal in a first frequency band. The second power amplifier amplifies a second transmission signal in a second frequency band different from the first frequency band. The first switch is connected to an antenna terminal. The second switch changes a connection of the first power amplifier and the first switch. The third switch changes a connection of the second power amplifier and the first switch. The mounting substrate has a first main surface and a second main surface opposed to each other, and the first power amplifier, the second power amplifier, the first switch, the second switch, and the third switch are disposed thereon. The first switch, the second switch, and the third switch are configured to be capable of simultaneously connecting the first power amplifier and the second power amplifier to the antenna terminal. The second switch and the third switch are disposed on mutually different main surfaces out of the first main surface and the second main surface of the mounting substrate.

A communication device according to an aspect of the present Disclosure includes the radio frequency module and a signal processing circuit to process the first transmission signal and the second transmission signal passing through the radio frequency module.

Advantageous Effects

With the use of the radio frequency module and the communication device according to the above-described configurations of the present Disclosure, it is possible to suppress the isolation lowering assuming transmission signals in different frequency bands are simultaneously transmitted.

DESCRIPTION OF EMBODIMENTS

Figure 1:
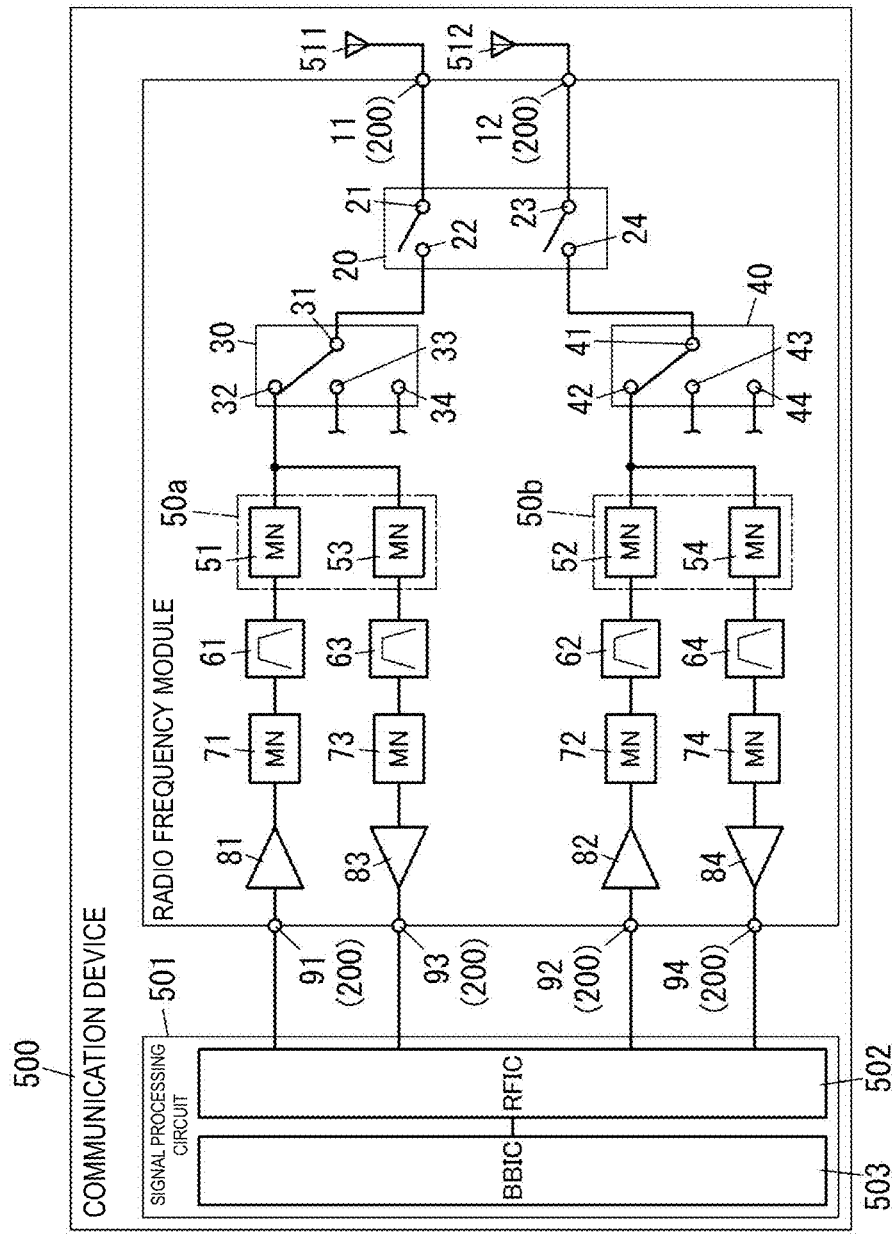
FIG. 1 is a schematic circuit diagram of a radio frequency module according to an embodiment.

FIG. 2 to FIG. 9 referred to in the following embodiment and the like each are a schematic diagram, and a ratio of sizes or thicknesses of constituent elements in the drawings does not necessarily reflect an actual dimensional ratio.

Embodiment

Hereinafter, a radio frequency module 1 and a communication device 500 according to the present embodiment will be described with reference to FIG. 1 to FIG. 4.

(1) Overview

The radio frequency module 1 includes a first power amplifier 81, a second power amplifier 82, a first switch 20, a second switch 30, and a third switch 40 as illustrated in FIG. 1. The first power amplifier 81 amplifies a first transmission signal in a first frequency band. The second power amplifier 82 amplifies a second transmission signal in a second frequency band different from the first frequency band. The first switch 20 is connected to antenna terminals (here, first antenna terminal 11 and second antenna terminal 12). The second switch 30 changes the connection of the first power amplifier 81 and the first switch 20. The third switch 40 changes the connection of the second power amplifier 82 and the first switch 20.

Figure 4:
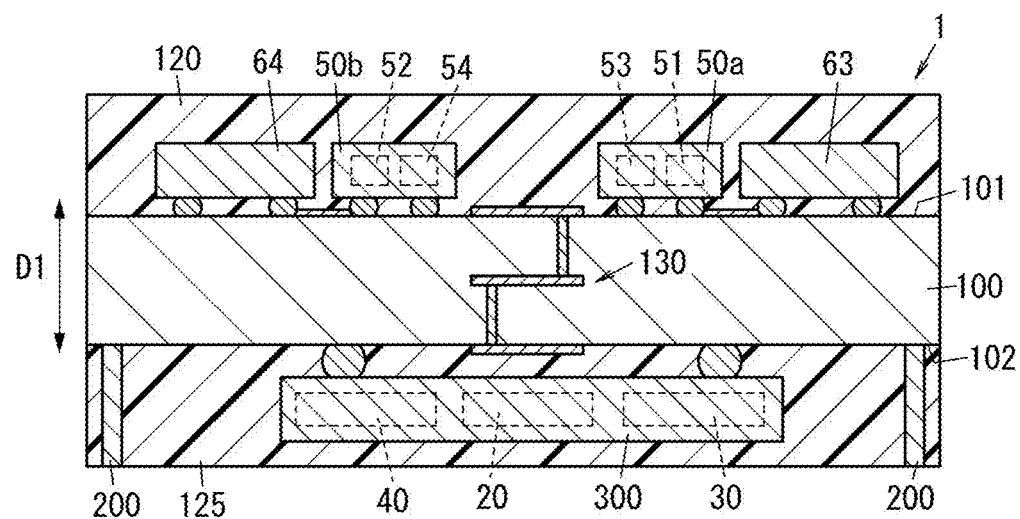
FIG. 4 is a sectional view of the radio frequency module taken along a line X1-X1 in FIG. 2.

The radio frequency module 1 further includes a mounting substrate 100, a first resin layer 120, and a second resin layer 125 as illustrated in FIG. 4. The mounting substrate 100 has a first main surface 101 and a second main surface 102 opposed to each other in a thickness direction D1 of the mounting substrate 100. The first power amplifier 81, the second power amplifier 82, the first switch 20, the second switch 30, and the third switch 40 are disposed on the mounting substrate 100.

The radio frequency module 1 according to the present embodiment is used in the communication device 500 supporting multimode/multiband system, for example. The communication device 500 is a mobile phone (smartphone, for example), for example, but is not limited thereto, and may be a wearable terminal (smart watch, for example) or the like, for example. The radio frequency module 1 is a module capable of supporting the fourth generation (4G) mobile communication standards, the fifth generation (5G) mobile communication standards, or the like, for example. The 4G standards are the Third Generation Partnership Project (3GPP) Long Term Evolution (LTE) standards, for example. The 5G standards are 5G New Radio (NR), for example. The first switch 20 is configured to be capable of simultaneously connecting the first power amplifier 81 and the second power amplifier 82 to the antenna terminals. That is, the radio frequency module 1 is a module capable of supporting carrier aggregation and dual connectivity. Here, carrier aggregation and dual connectivity each refer to communication using radio waves of multiple frequency bands simultaneously.

The radio frequency module 1 according to the present embodiment simultaneously performs communication of a signal in a frequency band defined by 4G and communication of a signal in another frequency band defined by 4G. The radio frequency module 1 simultaneously performs communication of a signal in a frequency band defined by 4G and communication of a signal in a frequency band defined by 5G. The radio frequency module 1 simultaneously performs communication of a signal in a frequency band defined by 5G and communication of a signal in another frequency band defined by 5G. Hereinafter, communication by carrier aggregation or dual connectivity is referred to as simultaneous communication as well.

The radio frequency module 1 according to the present embodiment performs communication in a mid-band frequency band (first frequency band) and communication in a high-band frequency band (second frequency band). In the present embodiment, as the high-band frequency band defined in 4G, Band41 (frequency band 2496 to 2690 MHz) is used, for example, and as the mid-band frequency band defined in 4G, Band1 (frequency band 1920 to 1980 MHz) is used, for example. As the high-band frequency band defined in 5G, n41 (frequency band 2496 to 2690 MHz) is used, for example, and as the mid-band frequency band defined in 5G, n1 (frequency band 1920 to 1980 MHz) is used, for example. Band41 and n41 are used for communication of a time division duplex (TDD) scheme. Band1 and n1 are used for frequency division duplex (FDD) scheme. As the high-band frequency band defined in 4G, Band40 may be used, for example. As the mid-band frequency band defined in 4G, Band3, Band2, Band25, Band4, Band66, Band39, or Band34 may be used, for example. As the mid-band frequency band defined in 5G, n3 may be used, for example.

In the present embodiment, the radio frequency module 1 is capable of simultaneous communication by carrier aggregation or dual connectivity. Therefore, the radio frequency module 1 is capable of simultaneous transmission in the high-band frequency band defined by 4G (or 5G) and in the mid-band frequency band defined by 4G (or 5G). The radio frequency module 1 is capable of simultaneous reception in the high-band frequency band defined by 4G (or 5G) and in the mid-band frequency band defined by 4G (or 5G). Furthermore, the radio frequency module 1 is capable of simultaneous transmission in the high-band frequency band defined by 4G (or 5G) and reception in the mid-band frequency band defined by 4G (or 5G). The radio frequency module 1 is capable of simultaneous reception in the high-band frequency band defined by 4G (or 5G) and transmission in the mid-band frequency band defined by 4G (or 5G).

In the present embodiment, a first transmission filter 61 allows a transmission signal (first transmission signal) in the mid-band frequency band (first frequency band) to pass through. A second transmission filter 62 allows a transmission signal (second transmission signal) in the high-band frequency band (second frequency band) that is a frequency band different from the first frequency band to pass through.

The radio frequency module 1 further includes the first transmission filter 61, the second transmission filter 62, a first reception filter 63, and a second reception filter 64 as illustrated in FIG. 1. The first reception filter 63 allows a reception signal (first reception signal) in the mid-band frequency band to pass through. The second reception filter 64 allows a reception signal (second reception signal) in the high-band frequency band that is a frequency band different from the mid-band frequency band to pass through. That is, the second reception filter 64 allows a reception signal (second reception signal) in a frequency band different from the frequency band of the first reception signal to pass through.

(2) Configuration

Hereinafter, configurations of the radio frequency module 1 and the communication device 500 according to the present embodiment will be described with reference to FIG. 1 to FIG. 4.

The radio frequency module 1 is configured to amplify a transmission signal (radio frequency signal) inputted from a signal processing circuit 501 (see FIG. 1) and to output the amplified transmission signal to a first antenna 511 and a second antenna 512, for example. The radio frequency module 1 is configured to amplify reception signals (radio frequency signals) inputted from the first antenna 511 and the second antenna 512 and to output the amplified reception signals to the signal processing circuit 501, for example. The signal processing circuit 501 is not a constituent element of the radio frequency module 1 but a constituent element of the communication device 500 including the radio frequency module 1. The radio frequency module 1 is controlled by the signal processing circuit 501 included in the communication device 500, for example. The communication device 500 includes the radio frequency module 1 and the signal processing circuit 501. The communication device 500 further includes the first antenna 511 and the second antenna 512. The communication device 500 further includes a circuit substrate on which the radio frequency module 1 is mounted. The circuit substrate is a printed wiring board, for example. The circuit substrate includes a ground electrode to which ground potential is applied.

The signal processing circuit 501 processes a signal (reception signal or transmission signal, for example) passing through the radio frequency module 1. The signal processing circuit 501 includes an RF signal processing circuit 502 and a baseband signal processing circuit 503, for example. The RF signal processing circuit 502 is a radio frequency integrated circuit (RFIC) and performs signal processing on a radio frequency signal, for example. The RF signal processing circuit 502 performs signal processing such as up-conversion on a radio frequency signal (transmission signal) outputted from the baseband signal processing circuit 503, and outputs the radio frequency signal subjected to the signal processing, for example. Further, the RF signal processing circuit 502 performs signal processing such as down-conversion on a radio frequency signal (reception signal) outputted from the radio frequency module 1, and outputs the radio frequency signal subjected to the signal processing to the baseband signal processing circuit 503, for example.

The baseband signal processing circuit 503 is a baseband integrated circuit (BBIC), for example. The baseband signal processing circuit 503 generates an I-phase signal and a Q-phase signal from a baseband signal. The baseband signal is an audio signal, an image signal, or the like inputted from the outside, for example. The baseband signal processing circuit 503 performs IQ modulation processing by combining the I-phase signal and the Q-phase signal, and outputs a transmission signal. At this time, the transmission signal is generated as a modulated signal (IQ signal) obtained by performing amplitude modulation on a carrier signal of a predetermined frequency with a period longer than the period of the carrier signal. The reception signal processed by the baseband signal processing circuit 503 is used for an image display as an image signal or for a call as an audio signal, for example. The radio frequency module 1 according to the present embodiment transfers a radio frequency signal (reception signal) from the first antenna 511 and the second antenna 512 to the RF signal processing circuit 502 of the signal processing circuit 501.

The radio frequency module 1 includes the first antenna terminal 11, the second antenna terminal 12, the first switch 20, the second switch 30, and the third switch 40 as illustrated in FIG. 1. Further, the radio frequency module 1 includes a first matching circuit 51, a second matching circuit 52, a third matching circuit 53, a fourth matching circuit 54, the first transmission filter 61, the second transmission filter 62, the first reception filter 63, and the second reception filter 64 as illustrated in FIG. 1. Furthermore, the radio frequency module 1 includes a fifth matching circuit 71, a sixth matching circuit 72, a seventh matching circuit 73, an eighth matching circuit 74, the first power amplifier 81, the second power amplifier 82, a first low-noise amplifier 83, and a second low-noise amplifier 84 as illustrated in FIG. 1. The radio frequency module 1 further includes a first input terminal 91, a second input terminal 92, a first output terminal 93, and a second output terminal 94.

The first antenna terminal 11 is electrically connected to the first antenna 511. The second antenna terminal 12 is electrically connected to the second antenna 512. Here, "A is connected to B" includes not only a case that A and B are in contact with each other but also a case that A and B are electrically connected to each other through a conductor electrode, a conductor terminal, a wiring line, another circuit component, or the like.

The first switch 20 is configured to be able to connect the second switch 30 to the first antenna 511 and to connect the third switch 40 to the second antenna 512. That is, the first switch 20 is configured to be able to simultaneously connect the second switch 30 and the third switch 40 to the first antenna 511 and the second antenna 512, respectively.

The first switch 20 is electrically connected to the antenna terminals. Specifically, the first switch 20 is electrically connected to the first antenna terminal 11 and the second antenna terminal 12. The first switch 20 is electrically connected to the second switch 30 and the third switch 40. Specifically, the first switch 20 has a first terminal 21, a second terminal 22, a third terminal 23, and a fourth terminal 24. Under the control of the signal processing circuit 501, the first switch 20 performs a connection operation (connection/disconnection operation) of the first terminal 21 and the second terminal 22 or of the first terminal 21 and the fourth terminal 24, and performs a connection operation (connection/disconnection operation) of the third terminal 23 and the fourth terminal 24 or of the third terminal 23 and the second terminal 22. The first terminal 21 is electrically connected to the first antenna terminal 11. That is, the first terminal 21 is electrically connected to the first antenna 511 through the first antenna terminal 11. The third terminal 23 is electrically connected to the second antenna terminal 12. That is, the third terminal 23 is electrically connected to the second antenna 512 through the second antenna terminal 12. Note that the first terminal 21 is not limited to being directly connected to the first antenna 511. A filter, a coupler, or the like may be provided between the first terminal 21 and the first antenna 511. Similarly, the third terminal 23 is not limited to being directly connected to the second antenna 512. A filter, a coupler, or the like may be provided between the third terminal 23 and the second antenna 512. The second terminal 22 is electrically connected to the second switch 30. The fourth terminal 24 is electrically connected to the third switch 40.

The second switch 30 is electrically connected to the first transmission filter 61 and the first reception filter 63. The second switch 30 is electrically connected to the first switch 20. Specifically, the second switch 30 has a common terminal 31 and multiple (three in the illustrated example) selection terminals 32, 33, and 34. The second switch 30 selects at least one of the multiple selection terminals 32, 33, and 34 as a connection destination of the common terminal 31 under the control of the signal processing circuit 501. The common terminal 31 is electrically connected to the second terminal 22 of the first switch 20. That is, the common terminal 31 is electrically connected to the first antenna terminal 11 through the first switch 20. That is, the common terminal 31 is electrically connected to the first antenna 511 through the first antenna terminal 11. The selection terminal 32 is electrically connected to the first transmission filter 61 and the first reception filter 63. The connection destination of each of the selection terminals 33 and 34 is omitted for the sake of convenience. The connection destination of each of the selection terminals 33 and 34 is electrically connected to a transmission filter and a reception filter to allow a signal of a frequency band in the mid-band frequency band to pass through. The frequency band in the mid-band frequency band is different from a frequency band of a signal which passes through the first transmission filter 61 and the first reception filter 63.

The third switch 40 is electrically connected to the second transmission filter 62 and the second reception filter 64. The third switch 40 is electrically connected to the first switch 20. Specifically, the third switch 40 has a common terminal 41 and multiple (three in the illustrated example) selection terminals 42, 43, and 44. The third switch 40 selects at least one of the multiple selection terminals 42, 43, and 44 as a connection destination of the common terminal 41 under the control of the signal processing circuit 501. The common terminal 41 is electrically connected to the fourth terminal 24 of the first switch 20. That is, the common terminal 41 is electrically connected to the second antenna terminal 12 through the first switch 20. That is, the common terminal 41 is electrically connected to the second antenna 512 through the second antenna terminal 12. The selection terminal 42 is electrically connected to the second transmission filter 62 and the second reception filter 64. The connection destination of each of the selection terminals 43 and 44 is omitted for the sake of convenience. The connection destination of each of the selection terminals 43 and 44 is electrically connected to a transmission filter and a reception filter to allow a signal of a frequency band in the high-band frequency band to pass through. The frequency band in the high-band frequency band is different from a frequency band of a signal which passes through the second transmission filter 62 and the second reception filter 64.

The first switch 20 is capable of simultaneously connecting to the second switch 30 and the third switch 40. Specifically, the first switch 20 is configured to be capable of simultaneously connecting the first power amplifier 81 and the second power amplifier 82 to the antenna terminals. More specifically, the first switch 20 is configured to be capable of simultaneously connecting the first power amplifier 81 to the first antenna terminal 11 and the second power amplifier 82 to the second antenna terminal 12, respectively. That is, the first switch 20 is capable of simultaneously connecting the first transmission filter 61 and the second transmission filter 62. By simultaneously connecting the first transmission filter 61 and the second transmission filter 62, simultaneous communication is possible with the first transmission filter 61 and the second transmission filter 62. "Simultaneous communication is possible" has a premise that frequency bands are allowed to perform simultaneous communication by the 3GPP LTE standards.

The first matching circuit 51 is an inductor, for example. More specifically, the first matching circuit 51 is a chip inductor. The first matching circuit 51 is electrically connected in a path between the second switch 30 and the first transmission filter 61, and performs impedance matching of the second switch 30 and the first transmission filter 61.

The second matching circuit 52 is an inductor, for example. More specifically, the second matching circuit 52 is a chip inductor. The second matching circuit 52 is electrically connected in a path between the third switch 40 and the second transmission filter 62, and performs impedance matching of the third switch 40 and the second transmission filter 62.

The third matching circuit 53 is an inductor, for example. More specifically, the third matching circuit 53 is a chip inductor. The third matching circuit 53 is electrically connected in a path between the second switch 30 and the first reception filter 63, and performs impedance matching of the second switch 30 and the first reception filter 63.

The fourth matching circuit 54 is an inductor, for example. More specifically, the fourth matching circuit 54 is a chip inductor. The fourth matching circuit 54 is electrically connected in a path between the third switch 40 and the second reception filter 64, and performs impedance matching of the third switch 40 and the second reception filter 64.

In the present embodiment, the first matching circuit 51 and the third matching circuit 53 are integrated into a single chip, and the second matching circuit 52 and the fourth matching circuit 54 are integrated into a single chip. In the present embodiment, a component in which the first matching circuit 51 and the third matching circuit 53 are integrated into a single chip is referred to as a first matching chip 50a, and a component in which the second matching circuit 52 and the fourth matching circuit 54 are integrated into a single chip is referred to as a second matching chip 50b.

The first transmission filter 61 is a filter to allow a transmission signal (first transmission signal) in the mid-band frequency band outputted from the first power amplifier 81 to pass through. The first transmission filter 61 is electrically connected to the second switch 30 through the first matching circuit 51. That is, the first transmission filter 61 is connected to the second switch 30 and allows the first transmission signal to pass through. The first transmission filter 61 is a ladder filter, for example, and includes multiple (four, for example) series arm resonators and multiple (three, for example) parallel arm resonators. The first transmission filter 61 is an acoustic wave filter, for example. In an acoustic wave filter, each of multiple series arm resonators and multiple parallel arm resonators is constituted of an acoustic wave resonator. An acoustic wave filter is a surface acoustic wave filter using a surface acoustic wave, for example. In a surface acoustic wave filter, each of multiple series arm resonators and multiple parallel arm resonators is a surface acoustic wave (SAW) resonator, for example. Note that the first transmission filter 61 is not limited to a SAW filter. The first transmission filter 61 may be other than a SAW filter, that is, may be a bulk acoustic wave (BAW) filter, for example. A resonator in a BAW filter is a film bulk acoustic resonator (FBAR) or a solidly mounted resonator (SMR), for example. A BAW filter includes a substrate. The substrate of a BAW filter is a silicon substrate, for example.

The second transmission filter 62 is a filter to allow a transmission signal (second transmission signal) in the high-band frequency band outputted from the second power amplifier 82 to pass through. The second transmission filter 62 is electrically connected to the third switch 40 through the second matching circuit 52. That is, the second transmission filter 62 is connected to the third switch 40 and allows a second transmission signal, different from the frequency band of a first transmission signal, to pass through. The second transmission filter 62 is a ladder filter, for example, and includes multiple (four, for example) series arm resonators and multiple (three, for example) parallel arm resonators. The second transmission filter 62 is an acoustic wave filter, for example. In an acoustic wave filter, each of multiple series arm resonators and multiple parallel arm resonators is constituted of an acoustic wave resonator. An acoustic wave filter is a surface acoustic wave filter using a surface acoustic wave, for example. In a surface acoustic wave filter, each of multiple series arm resonators and multiple parallel arm resonators is a SAW resonator, for example. Note that the second transmission filter 62 is not limited to a SAW filter. The second transmission filter 62 may be other than a SAW filter, that is, may be a BAW filter, for example.

The first reception filter 63 is a filter to allow a reception signal (first reception signal) in the mid-band frequency band inputted to the first low-noise amplifier 83 to pass through. The first reception filter 63 is electrically connected to the second switch 30 through the third matching circuit 53. That is, the first reception filter 63 is connected to the second switch 30 and allows the first reception signal to pass through. The first reception filter 63 is a ladder filter, for example, and includes multiple (four, for example) series arm resonators and multiple (three, for example) parallel arm resonators. The first reception filter 63 is an acoustic wave filter, for example. In an acoustic wave filter, each of multiple series arm resonators and multiple parallel arm resonators is constituted of an acoustic wave resonator. An acoustic wave filter is a surface acoustic wave filter using a surface acoustic wave, for example. In a surface acoustic wave filter, each of multiple series arm resonators and multiple parallel arm resonators is a SAW resonator, for example. Note that the first reception filter 63 is not limited to a SAW filter. The first reception filter 63 may be other than a SAW filter, that is, may be a BAW filter, for example.

The second reception filter 64 is a filter to allow a reception signal (second reception signal) in the high-band frequency band inputted to the second low-noise amplifier 84 to pass through. The second reception filter 64 is electrically connected to the third switch 40 through the fourth matching circuit 54. That is, the second reception filter 64 is connected to the third switch 40 and allows a second reception signal, in a frequency band different from the frequency band of a first reception signal, to pass through. The second reception filter 64 is a ladder filter, for example, and includes multiple (four, for example) series arm resonators and multiple (three, for example) parallel arm resonators. The second reception filter 64 is an acoustic wave filter, for example. In an acoustic wave filter, each of multiple series arm resonators and multiple parallel arm resonators is constituted of an acoustic wave resonator. An acoustic wave filter is a surface acoustic wave filter using a surface acoustic wave, for example. In a surface acoustic wave filter, each of multiple series arm resonators and multiple parallel arm resonators is a SAW resonator, for example. Note that the second reception filter 64 is not limited to a SAW filter. The second reception filter 64 may be other than a SAW filter, that is, may be a BAW filter, for example.

The fifth matching circuit 71 is an inductor, for example. More specifically, the fifth matching circuit 71 is a chip inductor. The fifth matching circuit 71 is electrically connected in a path between the first transmission filter 61 and the first power amplifier 81, and performs impedance matching of the first transmission filter 61 and the first power amplifier 81.

The sixth matching circuit 72 is an inductor, for example. More specifically, the sixth matching circuit 72 is a chip inductor. The sixth matching circuit 72 is electrically connected in a path between the second transmission filter 62 and the second power amplifier 82, and performs impedance matching of the second transmission filter 62 and the second power amplifier 82.

The seventh matching circuit 73 is an inductor, for example. More specifically, the seventh matching circuit 73 is a chip inductor. The seventh matching circuit 73 is electrically connected in a path between the first reception filter 63 and the first low-noise amplifier 83, and performs impedance matching of the first reception filter 63 and the first low-noise amplifier 83.

The eighth matching circuit 74 is an inductor, for example. More specifically, the eighth matching circuit 74 is a chip inductor. The eighth matching circuit 74 is electrically connected in a path between the second reception filter 64 and the second low-noise amplifier 84, and performs impedance matching of the second reception filter 64 and the second low-noise amplifier 84.

The first power amplifier 81 amplifies a transmission signal (first transmission signal) in the mid-band frequency band (first frequency band) outputted from the RF signal processing circuit 502 of the signal processing circuit 501. An input terminal of the first power amplifier 81 is electrically connected to the first input terminal 91. An output terminal of the first power amplifier 81 is electrically connected to the fifth matching circuit 71. That is, the first power amplifier 81 is electrically connected to the first transmission filter 61 through the fifth matching circuit 71. That is, the first power amplifier 81 is electrically connected to the second switch 30 through the first transmission filter 61.

The second power amplifier 82 amplifies a transmission signal (second transmission signal) in the high-band frequency band (second frequency band) outputted from the RF signal processing circuit 502 of the signal processing circuit 501. An input terminal of the second power amplifier 82 is electrically connected to the second input terminal 92. An output terminal of the second power amplifier 82 is electrically connected to the sixth matching circuit 72. That is, the second power amplifier 82 is electrically connected to the second transmission filter 62 through the sixth matching circuit 72. That is, the second power amplifier 82 is electrically connected to the third switch 40 through the second transmission filter 62.

The first low-noise amplifier 83 amplifies a reception signal that has passed through the first reception filter 63. An input terminal of the first low-noise amplifier 83 is electrically connected to the seventh matching circuit 73, and an output terminal of the first low-noise amplifier 83 is electrically connected to the first output terminal 93. That is, the first low-noise amplifier 83 is electrically connected to the first reception filter 63 through the seventh matching circuit 73. That is, the first low-noise amplifier 83 is electrically connected to the second switch 30 through the first reception filter 63.

The second low-noise amplifier 84 amplifies a reception signal that has passed through the second reception filter 64. An input terminal of the second low-noise amplifier 84 is electrically connected to the eighth matching circuit 74, and an output terminal of the second low-noise amplifier 84 is electrically connected to the second output terminal 94. That is, the second low-noise amplifier 84 is electrically connected to the second reception filter 64 through the eighth matching circuit 74. That is, the second low-noise amplifier 84 is electrically connected to the third switch 40 through the second reception filter 64.

The first input terminal 91, the second input terminal 92, the first output terminal 93, and the second output terminal 94 are connected to the RF signal processing circuit 502. That is, the first power amplifier 81 is electrically connected to the RF signal processing circuit 502 through the first input terminal 91. The second power amplifier 82 is electrically connected to the RF signal processing circuit 502 through the second input terminal 92. The first low-noise amplifier 83 is electrically connected to the RF signal processing circuit 502 through the first output terminal 93. The second low-noise amplifier 84 is electrically connected to the RF signal processing circuit 502 through the second output terminal 94.

The radio frequency module 1 further includes a mounting substrate 100, multiple (two in the illustrated diagram) outer connection terminals 200, a first resin layer 120, and a second resin layer 125 (see FIG. 4).

The mounting substrate 100 has a first main surface 101 and a second main surface 102 opposed to each other in the thickness direction D1 of the mounting substrate 100.

The mounting substrate 100 is a printed wiring board, a low temperature co-fired ceramics (LTCC) substrate, a high temperature co-fired ceramics (HTCC) substrate, or a resin multilayer substrate, for example. Here, the mounting substrate 100 is a multilayer substrate including multiple dielectric layers and multiple conductive layers, and is a ceramic substrate, for example. The multiple dielectric layers and the multiple conductive layers are laminated in the thickness direction D1 of the mounting substrate 100. The multiple conductive layers are formed in a predetermined pattern designated for each layer. Each of the multiple conductive layers includes one or more conductor portions in one plane orthogonal to the thickness direction D1 of the mounting substrate 100. The material of each conductive layer is copper, for example. The multiple conductive layers include a ground layer. In the radio frequency module 1, one or more ground terminals included in the multiple outer connection terminals 200 and the ground layer are electrically connected through via conductors or the like included in the mounting substrate 100.

The mounting substrate 100 is not limited to a printed wiring board or an LTCC substrate, and may be a wiring structural body. The wiring structural body is a multilayer structural body, for example. The multilayer structural body includes at least one insulation layer and at least one conductive layer. The insulation layer is formed in a predetermined pattern. Assuming there are multiple insulation layers, the multiple insulation layers each are formed in a predetermined pattern designated for each layer. The conductive layer is formed in a predetermined pattern different from the predetermined pattern of the insulation layer. Assuming there are multiple conductive layers, the multiple conductive layers each are formed in a predetermined pattern designated for each layer. The conductive layer may include one or more redistribution portions. In a wiring structural body, out of two surfaces opposed to each other in a thickness direction of a multilayer structural body, a first surface is the first main surface 101 of the mounting substrate 100, and a second surface is the second main surface 102 of the mounting substrate 100. A wiring structural body may be an interposer, for example. An interposer may be an interposer using a silicon substrate, or may be a substrate formed of multiple layers.

The first main surface 101 and the second main surface 102 of the mounting substrate 100 are separated from each other in the thickness direction D1 of the mounting substrate 100, and intersect with the thickness direction D1 of the mounting substrate 100. The first main surface 101 of the mounting substrate 100 is orthogonal to the thickness direction D1 of the mounting substrate 100, for example, but may include a side surface or the like of a conductor portion as a surface not orthogonal to the thickness direction D1, for example. The second main surface 102 of the mounting substrate 100 is orthogonal to the thickness direction D1 of the mounting substrate 100, for example, but may include a side surface or the like of a conductor portion as a surface not orthogonal to the thickness direction D1, for example. Further, the first main surface 101 and the second main surface 102 of the mounting substrate 100 may have fine irregularities, recesses, or protrusions. In plan view of the mounting substrate 100 from the thickness direction D1, the mounting substrate 100 has a rectangular shape, but is not limited thereto, and may have a square shape, for example. Here, a plan view of the mounting substrate 100 means that the mounting substrate 100 and electronic components mounted on the mounting substrate 100 are viewed by orthographic projection onto a plane parallel to a main surface (first main surface 101, for example) of the mounting substrate 100.

The radio frequency module 1 includes multiple electronic components. The multiple electronic components include the first switch 20, the second switch 30, the third switch 40, the first matching chip 50a, the second matching chip 50b, the first transmission filter 61, the second transmission filter 62, the first reception filter 63, the second reception filter 64, the fifth matching circuit 71 to the eighth matching circuit 74, the first power amplifier 81, the second power amplifier 82, the first low-noise amplifier 83, and the second low-noise amplifier 84. The first matching chip 50a includes the first matching circuit 51 and the third matching circuit 53. The second matching chip 50b includes the second matching circuit 52 and the fourth matching circuit 54.

Each of the multiple electronic components of the radio frequency module 1 is mounted on the first main surface 101 or the second main surface 102 of the mounting substrate 100. That is, in the radio frequency module 1, each of the multiple electronic components is disposed on the first main surface 101 or the second main surface 102 of the mounting substrate 100. The multiple electronic components are not limited to components mounted on the mounting substrate 100, and may include circuit elements provided in the mounting substrate 100. In FIG. 4, illustration of multiple wiring lines constituted of conductor portions, via conductors, and the like of the mounting substrate 100 described above is omitted.

Figure 2:
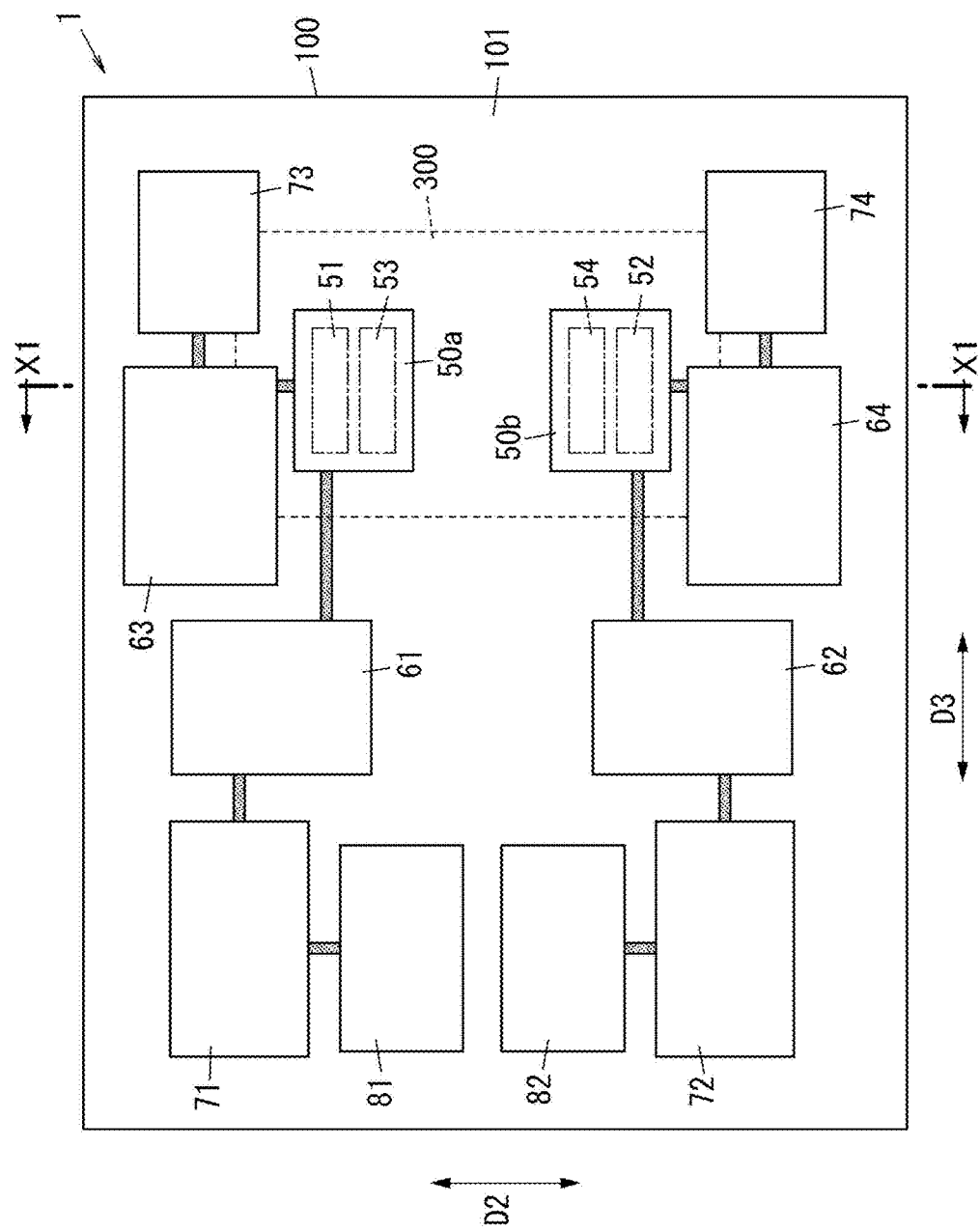
FIG. 2 is a plan view of an electronic component on a first main surface of a mounting substrate included in the radio frequency module illustrating a disposition thereof.

In the present embodiment, the first matching chip 50a, the second matching chip 50b, the first transmission filter 61, the second transmission filter 62, the first reception filter 63, the second reception filter 64, the fifth matching circuit 71 to the eighth matching circuit 74, the first power amplifier 81, and the second power amplifier 82 are disposed on the first main surface 101 (see FIG. 2). Here, "an electronic component (first transmission filter 61 or the like) is disposed on the first main surface 101" means that an electronic component is not only directly mounted on the first main surface 101 but also mechanically connected to the mounting substrate 100, and an electronic component is disposed, out of a space on a first main surface 101 side and a space on a second main surface 102 side separated by the mounting substrate 100, in the space on the first main surface 101 side. That is, included is a case that an electronic component is mounted on the first main surface 101 through other circuit elements, electrodes, or the like.

Figure 3:
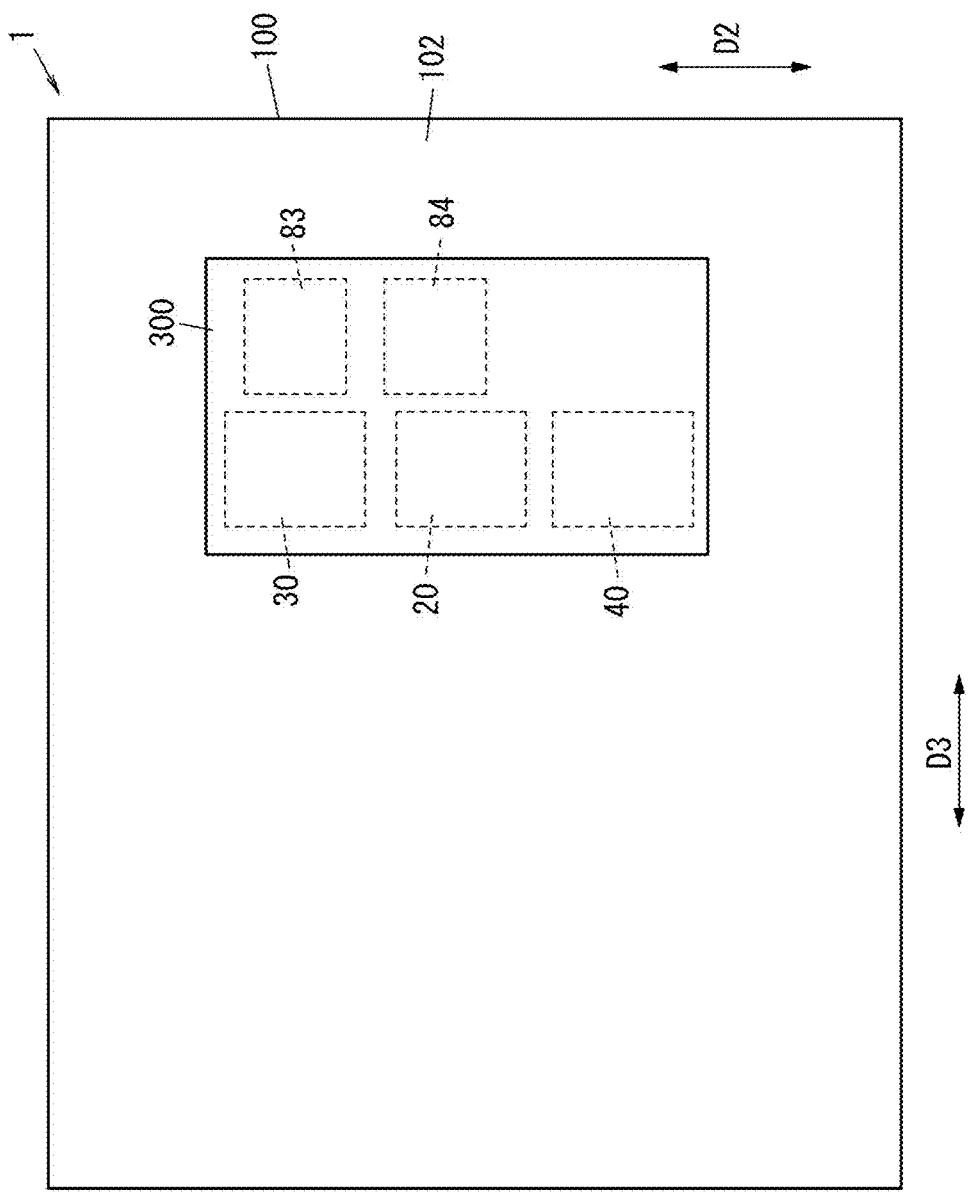
FIG. 3 is a plan view of an electronic component on a second main surface of the mounting substrate included in the radio frequency module illustrating a disposition thereof, seen through from a first main surface side of the mounting substrate.

The first switch 20, the second switch 30, the third switch 40, the first low-noise amplifier 83, and the second low-noise amplifier 84 are integrated into a single chip to form a switch IC 300 (see FIG. 3). The switch IC 300 is mounted on the second main surface 102 of the mounting substrate 100 (see FIG. 3). That is, the second switch 30 and the third switch 40 are disposed on the same main surface (here, second main surface 102), out of the first main surface 101 and the second main surface 102 of the mounting substrate 100. Furthermore, the first switch 20 is disposed on the same main surface (here, second main surface 102) as the main surface on which the second switch 30 and the third switch 40 are disposed. Here, "an electronic component (first switch 20 or the like) is disposed on the second main surface 102" means that an electronic component is not only directly mounted on the second main surface 102 but also mechanically connected to the mounting substrate 100, and an electronic component is disposed, out of the space on the first main surface 101 side and the space on the second main surface 102 side separated by the mounting substrate 100, in the space on the second main surface 102 side. That is, included is a case that an electronic component is mounted on the second main surface 102 through other circuit elements, electrodes, or the like.

The multiple outer connection terminals 200 are disposed on the second main surface 102. More specifically, the multiple outer connection terminals 200 are disposed on the second main surface 102 of the mounting substrate 100. Each of the multiple outer connection terminals 200 is constituted of a columnar electrode. Note that the outer connection terminal 200 is omitted in FIG. 3.

The multiple outer connection terminals 200 include the first antenna terminal 11, the second antenna terminal 12, one or more ground terminals, the first input terminal 91, the second input terminal 92, the first output terminal 93, and the second output terminal 94. The one or more ground terminals are connected to the ground layer of the mounting substrate 100 as described above. The ground layer is a circuit ground of the radio frequency module 1, and the multiple electronic components of the radio frequency module 1 include electronic components connected to the ground layer.

The first resin layer 120 covers the multiple electronic components disposed on the first main surface 101 of the mounting substrate 100 on the first main surface 101 side of the mounting substrate 100. Here, the first resin layer 120 seals the multiple electronic components disposed on the first main surface 101 of the mounting substrate 100. The first resin layer 120 includes resin (epoxy resin, for example). The first resin layer 120 may contain filler in addition to resin. Note that the first resin layer 120 is omitted in FIG. 2. Further, the second resin layer 125 is omitted in FIG. 3.

The second resin layer 125 is disposed on the second main surface 102 of the mounting substrate 100. The second resin layer 125 covers part of each of the multiple electronic components mounted on the second main surface 102 of the mounting substrate 100 and the multiple outer connection terminals 200 on the second main surface 102 side of the mounting substrate 100. The second resin layer 125 is formed to expose a tip face of each of the multiple outer connection terminals 200. The second resin layer 125 includes resin (epoxy resin, for example). The second resin layer 125 may contain filler in addition to resin. The material of the second resin layer 125 may be the same material as the material of the first resin layer 120, or may be a different material. Note that the second resin layer 125 is omitted in FIG. 3.

Hereinafter, a dispositional relationship of multiple electronic components included in the radio frequency module 1 will be described. Here, a direction orthogonal to a first direction D1 as the thickness direction D1 is defined as a second direction D2 (see FIG. 2), and a direction orthogonal to both the first direction D1 and the second direction is defined as a third direction D3.

The fifth matching circuit 71 and the first power amplifier 81 are disposed on the first main surface 101 adjacent to each other along the second direction D2. The fifth matching circuit 71, out of the fifth matching circuit 71 and the first power amplifier 81, is disposed closer to an end portion of the mounting substrate 100 than the first power amplifier 81 in the second direction D2. The sixth matching circuit 72 and the second power amplifier 82 are disposed on the first main surface 101 adjacent to each other along the second direction D2. The sixth matching circuit 72, out of the sixth matching circuit 72 and the second power amplifier 82, is disposed closer to an end portion of the mounting substrate 100 than the second power amplifier 82 in the second direction D2. Assuming the mounting substrate 100 is viewed from the third direction D3, the first power amplifier 81 and the second power amplifier 82 are disposed between the fifth matching circuit 71 and the sixth matching circuit 72 (see FIG. 2). Here, "the fifth matching circuit 71 and the first power amplifier 81 are adjacent to each other along the second direction D2" means that no other electronic components are present between the fifth matching circuit 71 and the first power amplifier 81 in the second direction D2. Similarly, "the sixth matching circuit 72 and the second power amplifier 82 are adjacent to each other along the second direction D2" means that no other electronic components are present between the sixth matching circuit 72 and the second power amplifier 82 in the second direction D2.

The first transmission filter 61 is disposed on the first main surface 101 to be adjacent to the fifth matching circuit 71 along the third direction D3. Assuming the mounting substrate 100 is viewed from the third direction D3, the first transmission filter 61 overlaps with the fifth matching circuit 71. The second transmission filter 62 is disposed on the first main surface 101 to be adjacent to the sixth matching circuit 72 along the third direction D3. Assuming the mounting substrate 100 is viewed from the third direction D3, the second transmission filter 62 overlaps with the sixth matching circuit 72. Here, "assuming the mounting substrate 100 is viewed from the third direction D3, an electronic component A overlaps with an electronic component B" includes that, assuming the mounting substrate 100 is viewed from the third direction D3, at least part of the electronic component A overlaps with at least part of the electronic component B.

The first matching chip 50a and the first reception filter 63 are disposed on the first main surface 101 adjacent to each other along the second direction D2. The first reception filter 63, out of the first matching chip 50a and the first reception filter 63, is disposed closer to an end portion of the mounting substrate 100 than the first matching chip 50a in the second direction D2. The second matching chip 50b and the second reception filter 64 are disposed on the first main surface 101 adjacent to each other along the second direction D2. The second reception filter 64, out of the second matching chip 50b and the second reception filter 64, is disposed closer to an end portion of the mounting substrate 100 than the second matching chip 50b in the second direction D2. Assuming the mounting substrate 100 is viewed from the third direction D3, the first matching chip 50a and the second matching chip 50b are disposed between the first reception filter 63 and the second reception filter 64 (see FIG. 2). Assuming the mounting substrate 100 is viewed from the third direction D3, the first transmission filter 61 overlaps with the first matching chip 50a. Assuming the mounting substrate 100 is viewed from the third direction D3, the second transmission filter 62 overlaps with the second matching chip 50b.

The seventh matching circuit 73 is disposed on the first main surface 101 to be adjacent to the first reception filter 63 along the third direction D3. The eighth matching circuit 74 is disposed on the first main surface 101 to be adjacent to the second reception filter 64 along the third direction D3. Assuming the mounting substrate 100 is viewed from the third direction D3, the first matching chip 50a and the second matching chip 50b are disposed between the seventh matching circuit 73 and the eighth matching circuit 74.

As described above, the switch IC 300 including the first switch 20, the second switch 30, the third switch 40, the first low-noise amplifier 83, and the second low-noise amplifier 84 is mounted on the second main surface 102 of the mounting substrate 100.

In plan view of the mounting substrate 100 from the first direction (thickness direction) D1, the first switch 20, the second switch 30, and the third switch 40 are disposed along the second direction D2 (see FIG. 3). At this time, the first switch 20 is disposed between the second switch 30 and the third switch 40 in plan view of the mounting substrate 100 from the first direction (thickness direction) D1. Here, "in plan view of the mounting substrate 100 from the first direction (thickness direction) D1, the first switch 20 is disposed between the second switch 30 and the third switch 40" means that, in plan view of the mounting substrate 100, at least one of multiple line segments connecting any point in the second switch 30 and any point in the third switch 40 passes through a region of the first switch 20.

In plan view of the mounting substrate 100 from the first direction (thickness direction) D1, the first matching chip 50a, the second matching chip 50b, the first reception filter 63, the second reception filter 64, the seventh matching circuit 73, and the eighth matching circuit 74 each overlap with the switch IC 300 (see FIG. 2).

More specifically, the first matching circuit 51 included in the first matching chip 50a overlaps with the second switch 30 in plan view of the mounting substrate 100 from the first direction D1. The second matching circuit 52 included in the second matching chip 50b overlaps with the third switch 40 in plan view of the mounting substrate 100 from the first direction D1 (see FIG. 4).

The first reception filter 63 overlaps with the second switch 30 in plan view of the mounting substrate 100 from the first direction D1 (see FIG. 4). The second reception filter 64 overlaps with the third switch 40 in plan view of the mounting substrate 100 from the first direction D1 (see FIG. 4).

Here, "in plan view of the mounting substrate 100 from the first direction D1, an electronic component A overlaps with the electronic component B" includes that in plan view of the mounting substrate 100 from the first direction D1, at least part of the electronic part A overlaps with at least part of the electronic part B.

Furthermore, in the present embodiment, in the mounting substrate 100, a ground path 130 is formed between the second switch 30 and the third switch 40 in plan view of the mounting substrate 100 from the first direction D1. The ground path 130 includes at least one of one or more ground layers and one or more via conductors included in the mounting substrate 100, and is connected to the ground.

(3) Effect

As described above, the radio frequency module 1 of the present embodiment includes the first power amplifier 81, the second power amplifier 82, the first switch 20, the second switch 30, the third switch 40, and the mounting substrate 100. The first power amplifier 81 amplifies a first transmission signal in the first frequency band. The second power amplifier 82 amplifies a second transmission signal in the second frequency band different from the first frequency band. The first switch 20 is connected to the antenna terminals (first antenna terminal 11 and second antenna terminal 12). The second switch 30 changes the connection of the first power amplifier 81 and the first switch 20. The third switch 40 changes the connection of the second power amplifier 82 and the first switch 20. The mounting substrate 100 has the first main surface 101 and the second main surface 102 opposed to each other, and the first power amplifier 81, the second power amplifier 82, the first switch 20, the second switch 30, and the third switch 40 are disposed thereon. The first switch 20, the second switch 30, and the third switch 40 are configured to be capable of simultaneously connecting the first power amplifier 81 and the second power amplifier 82 to the antenna terminals. The first switch 20 is disposed between the second switch 30 and the third switch 40 in plan view of the mounting substrate 100 from the thickness direction D1. The second switch 30 and the third switch 40 are disposed on the same main surface out of the first main surface 101 and the second main surface 102 of the mounting substrate 100.

With the use of the configuration above, the first switch 20 is disposed between the second switch 30 and the third switch 40. This makes it possible to increase a distance between a path from the first switch 20 to the first power amplifier 81 through the second switch 30 and a path from the first switch 20 to the second power amplifier 82 through the third switch 40. As a result, it is possible to suppress the isolation lowering assuming transmission signals in different frequency bands are simultaneously transmitted.

Assuming two transmission signals in different frequency bands are simultaneously transmitted, there is a possibility that the two transmission signals cause intermodulation distortion (IMD) on a reception side.

For example, simultaneously transmitting two transmission signals generates a new frequency component that is not present in the original two transmission signals. Assuming the new frequency component is included in the frequency band of a signal that passes through at least one of the first reception filter 63 and the second reception filter 64, there is a possibility that the new frequency component passes through the reception filter. Therefore, by separating the path from the first switch 20 to the first power amplifier 81 through the second switch 30 and the path from the first switch 20 to the second power amplifier 82 through the third switch 40, the possibility that the two transmission signals cause IMD on the reception side may be reduced.

(4) Modifications

Hereinafter, modifications according to the embodiment will be described.

(4.1) Modification 1

Figure 5:
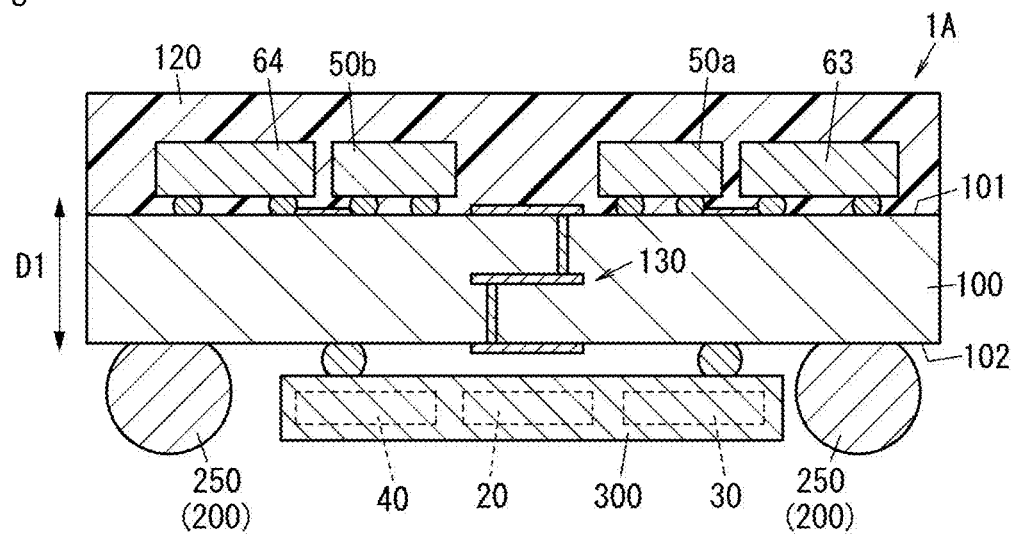
FIG. 5 is a sectional view of a radio frequency module according to Modification 1 of the embodiment.

A radio frequency module 1A according to Modification 1 will be described with reference to FIG. 5. Regarding the radio frequency module 1A according to Modification 1, the same constituent elements as those of the radio frequency module 1 according to the embodiment are denoted by the same signs, and a description thereof is omitted as appropriate.

The radio frequency module 1A according to Modification 1 is different from the radio frequency module 1 according to the embodiment in that the outer connection terminals as the multiple outer connection terminals 200 are ball bumps 250. The radio frequency module 1A according to Modification 1 is different from the radio frequency module 1 according to the embodiment in that the radio frequency module 1A does not include the second resin layer 125 of the radio frequency module 1 according to the embodiment. The radio frequency module 1A according to Modification 1 may include an underfill portion provided in a space between the switch IC 300 and the second main surface 102 of the mounting substrate 100.

The material of the ball bump 250 constituting each of the multiple outer connection terminals 200 is gold, copper, solder, or the like, for example.

The multiple outer connection terminals 200 may be a mixture of the outer connection terminals 200 constituted of the ball bumps 250 and the outer connection terminals 200 constituted of the columnar electrodes.

In Modification 1 as well, it is possible to suppress the isolation lowering assuming transmission signals in different frequency bands are simultaneously transmitted.

(4.2) Modification 2

In the above-described embodiment, the first switch 20, the second switch 30, and the third switch 40 are included in the single chip switch IC 300, but the present Disclosure is not limited to this configuration. The first switch 20, the second switch 30, and the third switch 40 are not necessarily integrated into a single chip.

Figure 6:
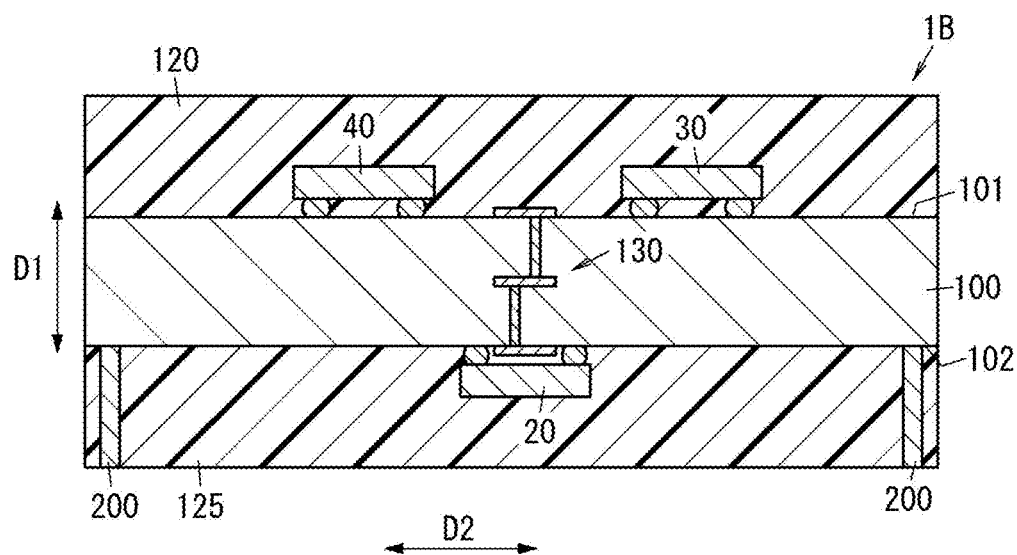
FIG. 6 is a sectional view of a radio frequency module according to Modification 2 of the embodiment.

In a case that the first switch 20, the second switch 30, and the third switch 40 are not integrated into a single chip, at least the second switch 30 and the third switch 40, out of the first switch 20, the second switch 30, and the third switch 40, are disposed on the same main surface, that is, on the first main surface 101 or on the second main surface 102. For example, in a radio frequency module 1B according to Modification 2, the second switch 30 and the third switch 40 are disposed on the first main surface 101, and the first switch 20 is disposed on the second main surface 102 as illustrated in FIG. 6. Alternatively, it is acceptable that the second switch 30 and the third switch 40 are disposed on the second main surface 102, and the first switch 20 is disposed on the first main surface 101.

In Modification 2 as well, the first switch 20, the second switch 30, and the third switch 40 are disposed along the second direction D2 in plan view of the mounting substrate 100 from the first direction (thickness direction) D1. At this time, the first switch 20 is disposed between the second switch 30 and the third switch 40 in plan view of the mounting substrate 100 from the first direction (thickness direction) D1.

(4.3) Modification 3

In a case that the first switch 20, the second switch 30, and the third switch 40 are not integrated into a single chip, the second switch 30 and the third switch 40 may be disposed on mutually different main surfaces.

Figure 7:
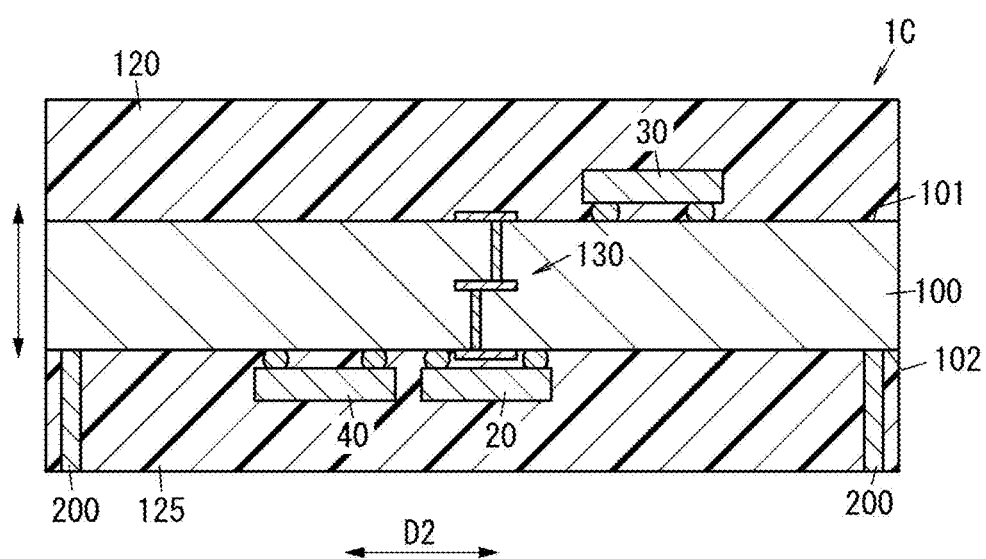
FIG. 7 is a sectional view of a radio frequency module according to Modification 3 of the embodiment.

For example, in a radio frequency module 1C according to Modification 3, the second switch 30 is disposed on the first main surface 101, and the third switch 40 and the first switch 20 are disposed on the second main surface 102 as illustrated in FIG. 7. Note that the first switch 20 may be disposed on the first main surface 101. In the radio frequency module 1C, it is acceptable that the first switch 20, the second switch 30, and the third switch 40 are disposed along the second direction D2, or not disposed along the second direction D2 in plan view of the mounting substrate 100 from the first direction (thickness direction) D1. Similarly, it is acceptable that the first switch 20 is disposed between the second switch 30 and the third switch 40, or not disposed between the second switch 30 and the third switch 40 in plan view of the mounting substrate 100 from the first direction (thickness direction) D1.

Figure 8:
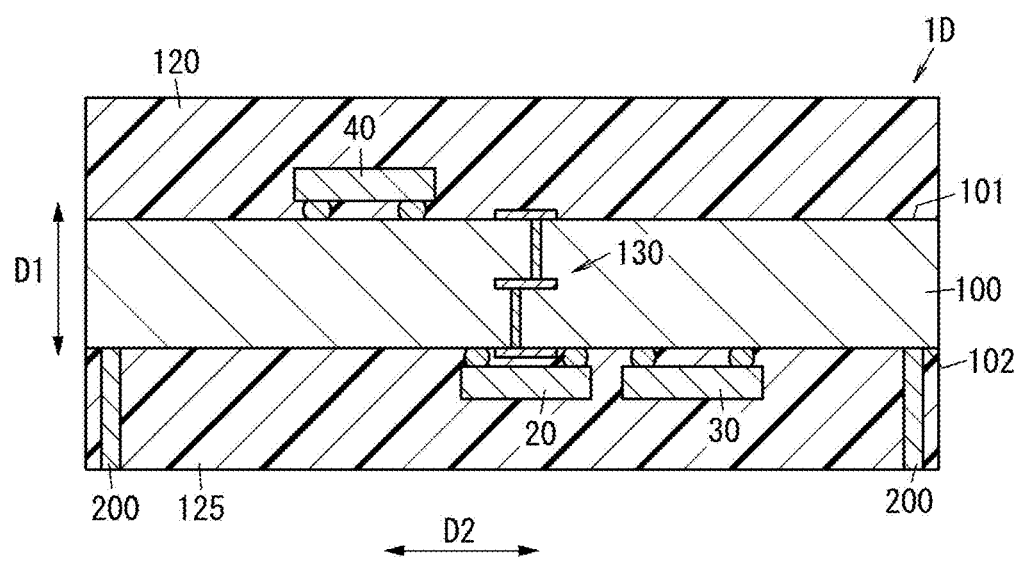
FIG. 8 is a sectional view of a radio frequency module according to another modification of Modification 3 of the embodiment.

Further, in a radio frequency module 1D according to another example of Modification 3, the first switch 20 and the second switch 30 are disposed on the second main surface 102, and the third switch 40 is disposed on the first main surface 101 as illustrated in FIG. 8. Note that the first switch 20 may be disposed on the first main surface 101. In the radio frequency module 1D, it is acceptable that the first switch 20, the second switch 30, and the third switch 40 are disposed along the second direction D2, or not disposed along the second direction D2 in plan view of the mounting substrate 100 from the first direction (thickness direction) D1. Similarly, it is acceptable that the first switch 20 is disposed between the second switch 30 and the third switch 40, or not disposed between the second switch 30 and the third switch 40 in plan view of the mounting substrate 100 from the first direction (thickness direction) D1.

(4.4) Modification 4

Figure 9:
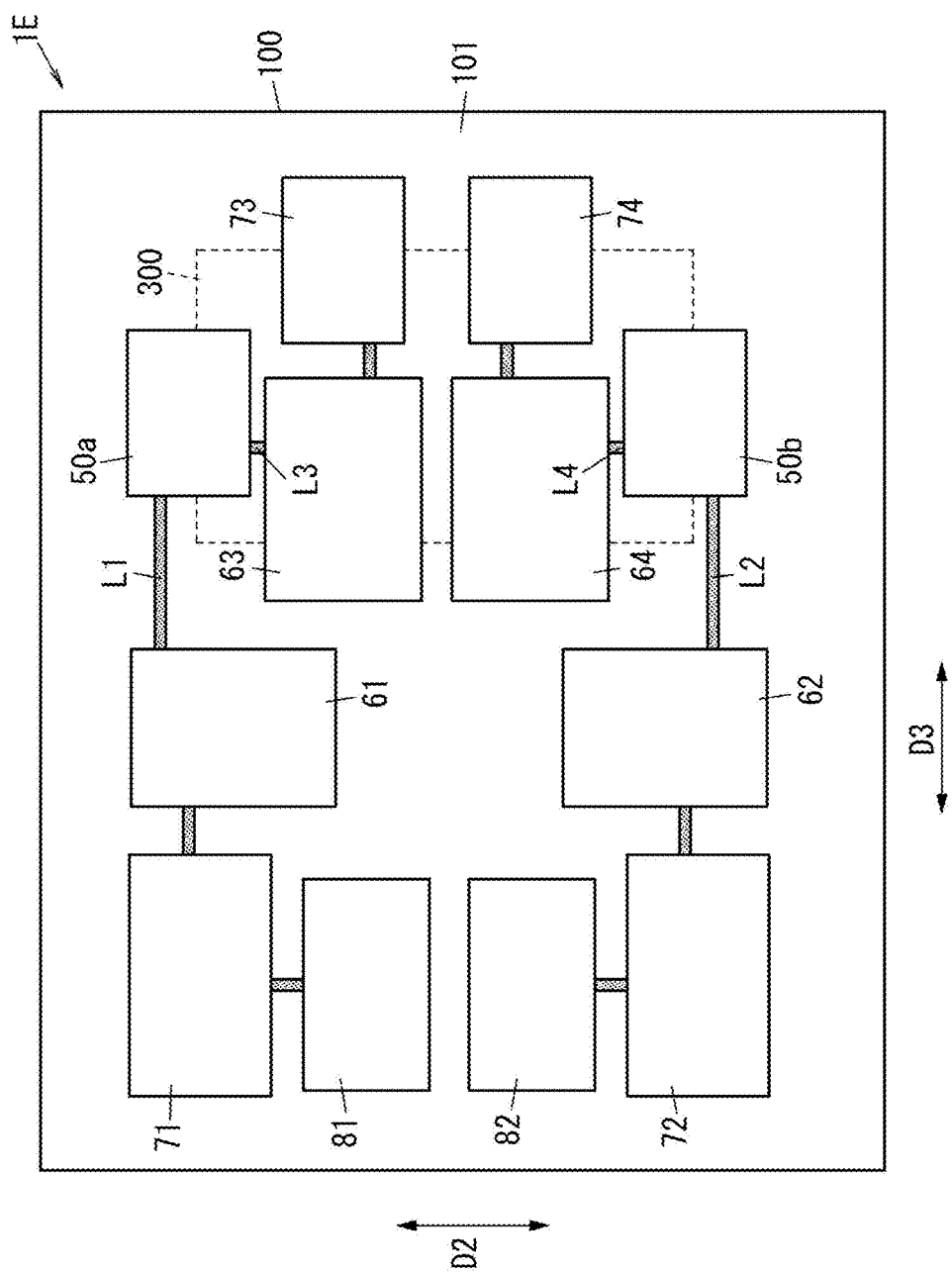
FIG. 9 is a plan view of an electronic component on a first main surface of a mounting substrate of the radio frequency module according to Modification 3 of the embodiment illustrating a disposition thereof.

A radio frequency module 1E according to Modification 4 is different from the radio frequency module 1 of the embodiment in that the first matching chip 50a is disposed closer to an end portion of the mounting substrate 100 than the first reception filter 63 in the second direction D2 as illustrated in FIG. 9. Further, the radio frequency module 1E according to Modification 4 is different from the radio frequency module 1 of the embodiment in that the second matching chip 50b is disposed closer to an end portion of the mounting substrate 100 than the second reception filter 64 in the second direction D2 as illustrated in FIG. 9. Note that first resin layer 120 is omitted in FIG. 9.

As described in the embodiment, the first transmission filter 61 is electrically connected to the second switch 30 through (the first matching circuit 51 of) the first matching chip 50a. The second transmission filter 62 is electrically connected to the third switch 40 through (the second matching circuit 52 of) the second matching chip 50b. Further, the first reception filter 63 is electrically connected to the second switch 30 through (the third matching circuit 53 of) the first matching chip 50a.

That is, by making the dispositional relationship of the first matching chip 50a and the first reception filter 63 as illustrated in FIG. 9, a path L3 between the first reception filter 63 and the second switch 30 is disposed between a path L1, which runs between the second switch 30 and the first power amplifier 81, and a path L2, which runs between the third switch 40 and the second power amplifier 82.

Similarly, by making the dispositional relationship of the second matching chip 50b and the second reception filter 64 as illustrated in FIG. 9, a path L4 between the second reception filter 64 and the third switch 40 is disposed between the path L1, which runs between the second switch 30 and the first power amplifier 81, and the path L2, which runs between the third switch and the second power amplifier.

Note that one of the dispositional relationship of the first matching chip 50a and the first reception filter 63 and the dispositional relationship of the second matching chip 50b and the second reception filter 64 may be the relationship as illustrated in FIG. 9. That is, the radio frequency module 1E includes a reception filter that is connected to one switch out of the second switch 30 and the third switch 40 and allows a reception signal to pass through. In plan view of the mounting substrate 100 from the thickness direction D1, a path between the above-described reception filter and the above-described one switch is disposed between the path L1, which runs between the second switch 30 and the first power amplifier 81, and the path L2, which runs between the third switch 40 and the second power amplifier 82.

With the use of the configuration above, it is possible to suppress the isolation lowering assuming transmission signals in different frequency bands are simultaneously transmitted.

(4.5) Modification 5

In the embodiment, the first reception filter 63 is configured to overlap with the second switch 30 in plan view of the mounting substrate 100 from the first direction D1, but is not limited to this configuration. The first transmission filter 61 may overlap with the second switch 30 in plan view of the mounting substrate 100 from the first direction D1. Alternatively, both the first transmission filter 61 and the first reception filter 63 may overlap with the second switch 30 in plan view of the mounting substrate 100 from the first direction D1. That is, at least one of the first transmission filter 61 and the first reception filter 63 overlaps with the second switch 30 in plan view of the mounting substrate 100 from the first direction (thickness direction) D1.

Similarly, in the embodiment, the second reception filter 64 is configured to overlap with the third switch 40 in plan view of the mounting substrate 100 from the first direction D1, but is not limited to this configuration. The second transmission filter 62 may overlap with the third switch 40 in plan view of the mounting substrate 100 from the first direction D1. Alternatively, both the second transmission filter 62 and the second reception filter 64 may overlap with the third switch 40 in plan view of the mounting substrate 100 from the first direction D1. That is, at least one of the second transmission filter 62 and the second reception filter 64 overlaps with the third switch 40 in plan view of the mounting substrate 100 from the first direction (thickness direction) D1.

(4.6) Modification 6

Hereinafter, modifications will be described.

In the embodiment, the switch IC 300 is configured to be disposed on the second main surface 102 of the mounting substrate 100, but is not limited to this configuration. The switch IC 300 may be disposed on the first main surface 101.

In the embodiment, the radio frequency module 1 is configured to have multiple antenna terminals (first antenna terminal 11 and second antenna terminal 12), but is not limited to this configuration. The radio frequency module 1 may be configured to have one antenna terminal. That is, the radio frequency module 1 may transmit a transmission signal in the mid-band frequency band and a transmission signal in the high-band frequency band through one antenna.

In the embodiment, each of the first matching circuit 51, the second matching circuit 52, the third matching circuit 53, and the fourth matching circuit 54 is configured to be a chip inductor, but is not limited to this configuration. Each of the first matching circuit 51, the second matching circuit 52, the third matching circuit 53, and the fourth matching circuit 54 may be a conductor portion such as a pattern, a capacitor, or a circuit in which an inductor and a capacitor are combined. Similarly, each of the fifth matching circuit 71, the sixth matching circuit 72, the seventh matching circuit 73, and the eighth matching circuit 74 may be a conductor portion such as a pattern, a capacitor, or a circuit in which an inductor and a capacitor are combined.

Summary

As described above, a radio frequency module (1; 1A; 1B; 1E) of the first aspect includes a first power amplifier (81), a second power amplifier (82), a first switch (20), a second switch (30), a third switch (40), and a mounting substrate (100). The first power amplifier (81) amplifies a first transmission signal in a first frequency band. The second power amplifier (82) amplifies a second transmission signal in a second frequency band different from the first frequency band. The first switch (20) is connected to antenna terminals (first antenna terminal 11 and second antenna terminal 12). The second switch (30) changes a connection of the first power amplifier (81) and the first switch (20). The third switch (40) changes a connection of the second power amplifier (82) and the first switch (20). The mounting substrate (100) has a first main surface (101) and a second main surface (102) opposed to each other, and the first power amplifier (81), the second power amplifier (82), the first switch (20), the second switch (30), and the third switch (40) are disposed thereon. The first switch (20), the second switch (30), and the third switch (40) are configured to be capable of simultaneously connecting the first power amplifier (81)

and the second power amplifier (82) to the antenna terminals. The first switch (20) is disposed between the second switch (30) and the third switch (40) in plan view of the mounting substrate (100) from the thickness direction (D1). The second switch (30) and the third switch (40) are disposed on the same main surface out of the first main surface (101) and the second main surface (102) of the mounting substrate (100).

With the use of the configuration above, it is possible to suppress the isolation lowering assuming transmission signals in different frequency bands are simultaneously transmitted.

A radio frequency module (1C; 1D) of a second aspect includes a first power amplifier (81), a second power amplifier (82), a first switch (20), a second switch (30), a third switch (40), and a mounting substrate (100). The first power amplifier (81) amplifies a first transmission signal in a first frequency band. The second power amplifier (82) amplifies a second transmission signal in a second frequency band different from the first frequency band. The first switch (20) is connected to antenna terminals (first antenna terminal 11 and second antenna terminal 12). The second switch (30) changes a connection of the first power amplifier (81) and the first switch (20). The third switch (40) changes a connection of the second power amplifier (82) and the first switch (20). The mounting substrate (100) has a first main surface (101) and a second main surface (102) opposed to each other, and the first power amplifier (81), the second power amplifier (82), the first switch (20), the second switch (30), and the third switch (40) are disposed thereon. The first switch (20), the second switch (30), and the third switch (40) are configured to be capable of simultaneously connecting the first power amplifier (81) and the second power amplifier (82) to the antenna terminals. The second switch (30) and the third switch (40) are disposed on mutually different main surfaces out of the first main surface (101) and the second main surface (102) of the mounting substrate (100).

With the use of the configuration above, a distance between a path from the first switch (20) to the first power amplifier (81) through the second switch (30) and a path from the first switch (20) to the second power amplifier (82) through the third switch (40) may be increased. As a result, it is possible to suppress the isolation lowering assuming transmission signals in different frequency bands are simultaneously transmitted.

In a radio frequency module (1; 1A; 1B; 1E) of a third aspect, the first switch (20) is disposed on the same main surface of the mounting substrate (100) on which the second switch (30) and the third switch (40) are disposed, in the first aspect.

With the use of the configuration above, it is possible to reduce a wiring length between the first switch (20) and the second switch (30) and a wiring length between the first switch (20) and the second switch (30), respectively.

A radio frequency module (1; 1A; 1B; 1E) according to a fourth aspect further includes multiple outer connection terminals (200) disposed on the second main surface (102), in the third aspect. The first switch (20), the second switch (30), and the third switch (40) are disposed on the second main surface (102) of the mounting substrate (100).

With the use of the configuration above, the mounting substrate (100) may be reduced in size.

In a radio frequency module (1; 1A; 1B; 1E) according to a fifth aspect, the first switch (20), the second switch (30), and the third switch (40) are integrated into a single chip, in the fourth aspect.

With the use of the configuration above, the mounting substrate (100) may be reduced in size.

A radio frequency module (1: 1A; 1B; 1E) of a sixth aspect further includes a first transmission filter (61) and a first matching circuit (51), in the fourth or fifth aspect. The first transmission filter (61) allows a first transmission signal outputted from the first power amplifier (81) to pass through. The first matching circuit (51) performs impedance matching of the first transmission filter (61) and the second switch (30). The first transmission filter (61) and the first matching circuit (51) are disposed on the first main surface (101) of the mounting substrate (100). The first matching circuit (51) overlaps with the second switch (30) in plan view of the mounting substrate (100) from the thickness direction (D1).

With the use of the configuration above, a path length between the second switch (30) and the first matching circuit (51) may be shortened.

A radio frequency module (1: 1A; 1B; 1E) according to a seventh aspect includes a first reception filter (63), in the sixth aspect. The first reception filter (63) is connected to the second switch (30) and allows a first reception signal to pass through. The first reception filter (63) is disposed on the first main surface (101) of the mounting substrate (100). At least one of the first transmission filter (61) and the first reception filter (63) overlaps with the second switch (30) in plan view of the mounting substrate (100) from the thickness direction (D1).

With the use of the configuration above, a path length between the second switch (30) and the above-described one filter may be shortened.

A radio frequency module (1: 1A; 1B; 1E) of an eighth aspect further includes a second transmission filter (62) and a second matching circuit (52), in any one of the fourth to seventh aspects. The second transmission filter (62) allows a second transmission signal outputted from the second power amplifier (82) to pass through. The second matching circuit (52) performs impedance matching of the second transmission filter (62) and the third switch (40). The second transmission filter (62) and the second matching circuit (52) are disposed on the first main surface (101) of the mounting substrate (100). The second matching circuit (52) overlaps with the third switch (40) in plan view of the mounting substrate (100) from the thickness direction (D1).

With the use of the configuration above, a path length between the third switch (40) and the second matching circuit (52) may be shortened.

A radio frequency module (1: 1A; 1B; 1E) according to a ninth aspect includes a second reception filter (64), in the eighth aspect. The second reception filter (64) is connected to the third switch (40) and allows a second reception signal to pass through. The second reception filter (64) is disposed on the first main surface (101) of the mounting substrate (100). At least one of the second transmission filter (62) and the second reception filter (64) overlaps with the third switch (40) in plan view of the mounting substrate (100) from the thickness direction (D1).

With the use of the configuration above, the path length between the third switch (40) and the above-described one filter may be shortened.

In the radio frequency module (1: 1A; 1B; 1C; 1D; 1E) of a tenth aspect, a path (ground path 130, for example) connected to a ground is formed between the second switch (30) and the third switch (40) on the mounting substrate (100) in plan view of the mounting substrate (100) from the thickness direction (D1), in any one of the first to ninth aspects.

With the use of the configuration above, providing a path connected to the ground between the second switch (30) and the third switch (40), in plan view of the mounting substrate (100) from the thickness direction (D1), makes it possible to suppress the isolation lowering assuming transmission signals in different frequency bands are simultaneously transmitted.

A radio frequency module (1: 1A; 1B; 1C; 1D; 1E) according to an eleventh aspect further includes reception filters (first reception filter 63 and second reception filter 64), in any one of the first to tenth aspects. The reception filters are each connected to one switch out of the second switch (30) and the third switch (40) and allow a reception signal to pass through. In plan view of the mounting substrate (100) from the thickness direction (D1), a path (path L3 or path L4) between the reception filter and the one switch is disposed between a path (L1) which runs between the second switch (30) and the first power amplifier (81), and a path (L2) which runs between the third switch (40) and the second power amplifier (82).

With the use of the configuration above, the paths (path L3 and L4) of reception signals are disposed between the path (L1) which runs between the second switch (30) and the first power amplifier (81), and the path (L2) which runs between the third switch (40) and the second power amplifier (82). Thus, the path (L1) between the second switch (30) and the first power amplifier (81) and the path (L2) between the third switch (40) and the second power amplifier (82) may be separated from each other. As a result, it is possible to suppress the isolation lowering assuming transmission signals in different frequency bands are simultaneously transmitted.

A communication device (500) of a twelfth aspect includes the radio frequency module (1: 1A; 1B; 1C; 1D; 1E) of any one of the first to eleventh aspects and a signal processing circuit (501). The signal processing circuit (501) processes a first transmission signal and a second transmission signal passing through the radio frequency module (1: 1A; 1B; 1C; 1D; 1E).

With the use of the configuration above, it is possible to suppress the isolation lowering assuming transmission signals in different frequency bands are simultaneously transmitted.

REFERENCE SIGNS LIST 1, 1A, 1B, 1C, 1D, 1E RADIO FREQUENCY MODULE
11 FIRST ANTENNA TERMINAL (ANTENNA TERMINAL)
12 SECOND ANTENNA TERMINAL (ANTENNA TERMINAL)
20 FIRST SWITCH
21 FIRST TERMINAL
22 SECOND TERMINAL
23 THIRD TERMINAL
24 FOURTH TERMINAL
30 SECOND SWITCH
31 COMMON TERMINAL
32, 33, 34 SELECTION TERMINAL
40 THIRD SWITCH
41 COMMON TERMINAL
42, 43, 44 SELECTION TERMINAL
50a FIRST MATCHING CHIP
50b SECOND MATCHING CHIP
51 FIRST MATCHING CIRCUIT
52 SECOND MATCHING CIRCUIT
53 THIRD MATCHING CIRCUIT
54 FOURTH MATCHING CIRCUIT
61 FIRST TRANSMISSION FILTER
62 SECOND TRANSMISSION FILTER
63 FIRST RECEPTION FILTER
64 SECOND RECEPTION FILTER
71 FIFTH MATCHING CIRCUIT
72 SIXTH MATCHING CIRCUIT
73 SEVENTH MATCHING CIRCUIT
74 EIGHTH MATCHING CIRCUIT
81 FIRST POWER AMPLIFIER
82 SECOND POWER AMPLIFIER
83 FIRST LOW-NOISE AMPLIFIER
84 SECOND LOW-NOISE AMPLIFIER
91 FIRST INPUT TERMINAL
92 SECOND INPUT TERMINAL
93 FIRST OUTPUT TERMINAL
94 SECOND OUTPUT TERMINAL
100 MOUNTING SUBSTRATE
101 FIRST MAIN SURFACE
102 SECOND MAIN SURFACE
120 FIRST RESIN LAYER
125 SECOND RESIN LAYER
130 GROUND PATH
200 OUTER CONNECTION TERMINAL
250 BALL BUMP
300 SWITCH IC
500 COMMUNICATION DEVICE
501 SIGNAL PROCESSING CIRCUIT
502 RF SIGNAL PROCESSING CIRCUIT
503 BASEBAND SIGNAL PROCESSING CIRCUIT
511 FIRST ANTENNA
512 SECOND ANTENNA
D1 FIRST DIRECTION (THICKNESS DIRECTION)
D2 SECOND DIRECTION
D3 THIRD DIRECTION
L1, L2, L3, L4 PATH

The invention claimed is:
1. A radio frequency module, comprising:
a first power amplifier configured to amplify a first transmission signal in a first frequency band;
a second power amplifier configured to amplify a second transmission signal in a second frequency band different from the first frequency band;
a first switch connected to an antenna terminal;
a second switch configured to change connection of the first power amplifier and the first switch;
a third switch configured to change connection of the second power amplifier and the first switch; and
a mounting substrate having a first main surface and a second main surface opposed to each other and on which the first power amplifier, the second power amplifier, the first switch, the second switch, and the third switch are disposed,
wherein the first switch, the second switch, and the third switch are configured to be capable of simultaneously connecting the first power amplifier and the second power amplifier to the antenna terminal,
the first switch is disposed between the second switch and the third switch in plan view of the mounting substrate from a thickness direction, and
the second switch and the third switch are disposed on the same main surface out of the first main surface and the second main surface of the mounting substrate.
2. A radio frequency module, comprising:
a first power amplifier configured to amplify a first transmission signal in a first frequency band;

a second power amplifier configured to amplify a second transmission signal in a second frequency band different from the first frequency band;
a first switch connected to an antenna terminal;
a second switch configured to change connection of the first power amplifier and the first switch;
a third switch configured to change connection of the second power amplifier and the first switch; and
a mounting substrate having a first main surface and a second main surface opposed to each other and on which the first power amplifier, the second power amplifier, the first switch, the second switch, and the third switch are disposed,
wherein the first switch, the second switch, and the third switch are configured to be capable of simultaneously connecting the first power amplifier and the second power amplifier to the antenna terminal, and
the second switch and the third switch are disposed on mutually different main surfaces out of the first main surface and the second main surface of the mounting substrate.

3. The radio frequency module according to claim 1, wherein the first switch is disposed on the same main surface of the mounting substrate on which the second switch and the third switch are disposed.

4. The frequency module according to claim 3, further comprising:
multiple outer connection terminals disposed on the second main surface,
wherein the first switch, the second switch, and the third switch are disposed on the second main surface of the mounting substrate.

5. The frequency module according to claim 4, wherein the first switch, the second switch, and the third switch are integrated into a single chip.

6. The frequency module according to claim 5, further comprising:
a first transmission filter configured to allow the first transmission signal outputted from the first power amplifier to pass through; and
a first matching circuit configured to perform impedance matching of the first transmission filter and the second switch,
wherein the first transmission filter and the first matching circuit are disposed on the first main surface of the mounting substrate, and
the first matching circuit overlaps with the second switch in plan view of the mounting substrate from the thickness direction.

7. The frequency module according to claim 6, further comprising:
a first reception filter connected to the second switch and configured to allow a first reception signal to pass through,
wherein the first reception filter is disposed on the first main surface of the mounting substrate, and
at least one of the first transmission filter and the first reception filter overlaps with the second switch in plan view of the mounting substrate from the thickness direction.

8. The frequency module according to claim 7, further comprising:
a second transmission filter configured to allow the second transmission signal outputted from the second power amplifier to pass through; and
a second matching circuit configured to perform impedance matching of the second transmission filter and the third switch,
wherein the second transmission filter and the second matching circuit are disposed on the first main surface of the mounting substrate, and
the second matching circuit overlaps with the third switch in plan view of the mounting substrate from the thickness direction.

9. The frequency module according to claim 8, further comprising:
a second reception filter connected to the third switch and configured to allow a second reception signal to pass through,
wherein the second reception filter is disposed on the first main surface of the mounting substrate, and
at least one of the second transmission filter and the second reception filter overlaps with the third switch in plan view of the mounting substrate from the thickness direction.

10. The frequency module according to claim 9, wherein in the mounting substrate, a path connected to a ground is formed between the second switch and the third switch in plan view of the mounting substrate from a thickness direction.

11. The radio frequency module according to claim 10, further comprising:
a reception filter connected to one switch out of the second switch and the third switch and configured to allow a reception signal to pass through,
wherein in plan view of the mounting substrate from a thickness direction, a path between the reception filter and the one switch is disposed between a path which runs between the second switch and the first power amplifier, and a path which runs between the third switch and the second power amplifier.

12. The radio frequency module according to claim 4, further comprising:
a first transmission filter configured to allow the first transmission signal outputted from the first power amplifier to pass through; and
a first matching circuit configured to perform impedance matching of the first transmission filter and the second switch,
wherein the first transmission filter and the first matching circuit are disposed on the first main surface of the mounting substrate, and
the first matching circuit overlaps with the second switch in plan view of the mounting substrate from the thickness direction.

13. The radio frequency module according to claim 12, further comprising:
a first reception filter connected to the second switch and configured to allow a first reception signal to pass through,
wherein the first reception filter is disposed on the first main surface of the mounting substrate, and
at least one of the first transmission filter and the first reception filter overlaps with the second switch in plan view of the mounting substrate from the thickness direction.

14. The radio frequency module according to claim 4, further comprising:
a second transmission filter configured to allow the second transmission signal outputted from the second power amplifier to pass through; and a second matching circuit configured to perform impedance matching of the second transmission filter and the third switch,
wherein the second transmission filter and the second matching circuit are disposed on the first main surface of the mounting substrate, and
the second matching circuit overlaps with the third switch in plan view of the mounting substrate from the thickness direction.

15. The radio frequency module according to claim 14, further comprising:
a second reception filter connected to the third switch and configured to allow a second reception signal to pass through,
wherein the second reception filter is disposed on the first main surface of the mounting substrate, and
at least one of the second transmission filter and the second reception filter overlaps with the third switch in plan view of the mounting substrate from the thickness direction.

16. The radio frequency module according to claim 5, further comprising:
a second transmission filter configured to allow the second transmission signal outputted from the second power amplifier to pass through; and
a second matching circuit configured to perform impedance matching of the second transmission filter and the third switch,
wherein the second transmission filter and the second matching circuit are disposed on the first main surface of the mounting substrate, and
the second matching circuit overlaps with the third switch in plan view of the mounting substrate from the thickness direction.

17. The radio frequency module according to claim 16, further comprising:
a second reception filter connected to the third switch and configured to allow a second reception signal to pass through,
wherein the second reception filter is disposed on the first main surface of the mounting substrate, and
at least one of the second transmission filter and the second reception filter overlaps with the third switch in plan view of the mounting substrate from the thickness direction.

18. The radio frequency module according to claim 6, further comprising:
a second transmission filter configured to allow the second transmission signal outputted from the second power amplifier to pass through; and
a second matching circuit configured to perform impedance matching of the second transmission filter and the third switch,
wherein the second transmission filter and the second matching circuit are disposed on the first main surface of the mounting substrate, and
the second matching circuit overlaps with the third switch in plan view of the mounting substrate from the thickness direction.

19. The radio frequency module according to claim 18, further comprising:
a second reception filter connected to the third switch and configured to allow a second reception signal to pass through,
wherein the second reception filter is disposed on the first main surface of the mounting substrate, and
at least one of the second transmission filter and the second reception filter overlaps with the third switch in plan view of the mounting substrate from the thickness direction.

20. A communication device, comprising:
the radio frequency module according to claim 1; and
a signal processing circuit configured to process the first transmission signal and the second transmission signal passing through the radio frequency module.

* * * * *